(12) United States Patent
Chun et al.

(10) Patent No.: US 11,007,825 B2
(45) Date of Patent: May 18, 2021

(54) TIRE

(71) Applicant: HANKOOK TIRE CO., LTD., Seoul (KR)

(72) Inventors: Eun Chang Chun, Daejeon (KR); Yong Keun Kim, Daejeon (KR); Myeong Rak Choi, Daejeon (KR)

(73) Assignee: HANKOOK TIRE CO., LTD., Seoul (KR)

( * ) Notice: Subject to any disclaimer, the term of this patent is extended or adjusted under 35 U.S.C. 154(b) by 368 days.

(21) Appl. No.: 15/859,999

(22) Filed: Jan. 2, 2018

(65) Prior Publication Data

US 2018/0186195 A1 Jul. 5, 2018

(30) Foreign Application Priority Data

Jan. 3, 2017 (KR) .......................... 10-2017-0000819

(51) Int. Cl.
*B60C 13/02* (2006.01)
*B60C 13/00* (2006.01)
(Continued)

(52) U.S. Cl.
CPC ............ *B60C 13/023* (2013.01); *B60C 11/01* (2013.01); *B60C 13/002* (2013.01); *B60C 13/02* (2013.01);
(Continued)

(58) Field of Classification Search
CPC ....... B60C 13/023; B60C 13/02; B60C 11/01; B60C 11/02; B60C 152/153
See application file for complete search history.

(56) References Cited

U.S. PATENT DOCUMENTS

| 627,483 | A | * | 6/1899 | Comly | ................... B60C 27/16 152/175 |
| 6,460,584 | B1 | * | 10/2002 | de Labareyre | ............ B60C 3/04 152/154 |
| 2013/0174955 | A1 | * | 7/2013 | Yasunaga | ................ B60C 13/04 152/524 |

FOREIGN PATENT DOCUMENTS

JP        10086609 A    *  4/1998
JP      2000318410 A       11/2000
(Continued)

OTHER PUBLICATIONS

Korean Office Action issued in corresponding Korean Patent Application No. 10-2017-0000819, dated Feb. 14, 2018 (11 pages).
(Continued)

*Primary Examiner* — Steven D Maki
*Assistant Examiner* — Cedrick S Williams
(74) *Attorney, Agent, or Firm* — Novick, Kim & Lee, PLLC; Jae Youn Kim; Jihun Kim (57) ABSTRACT

A tire that can attach and detach and that can prevent splash when running a wet road and cool discharging a heat is provided. The tire having a tread and a shoulder portion connected to the tread includes a protector portion provided in a circumferential direction at a side surface of the shoulder portion and in which a plurality of penetration portions are formed at a predetermined gap in a length direction; a plurality of protruding portions provided in the protector portion and formed at a predetermined gap in a length direction of the protector portion; and a plurality of installation grooves formed at a side surface of the shoulder portion such that the protruding portion attaches or detaches when the protruding portion enters or discharges.

11 Claims, 9 Drawing Sheets

(51) Int. Cl.
*B60C 11/01* (2006.01)
*B60C 23/19* (2006.01)
(52) U.S. Cl.
CPC ............ *B60C 23/19* (2013.01); *B60C 13/003* (2013.01); *B60C 2011/013* (2013.01)

(56) References Cited

FOREIGN PATENT DOCUMENTS

| | | | | |
|---|---|---|---|---|
| JP | 2013028284 | A | * | 2/2013 |
| KR | 1020050051197 | A | * | 6/2005 |
| KR | 10-2010-0123226 | | | 11/2010 |

OTHER PUBLICATIONS

Korean Decision for Grant of Patent issued in corresponding Korean Patent Application No. 10-2017-0000819, dated Feb. 28, 2018 (3 pages).

* cited by examiner

TIRE

CROSS-REFERENCE TO RELATED APPLICATION

This application claims priority to and the benefit of Korean Patent Application No. 10-2017-0000819, filed on Jan. 3, 2017, the disclosure of which is incorporated herein by reference in its entirety.

BACKGROUND OF THE INVENTION

Field of the Invention

The present invention relates to a tire, and more particularly, to a tire that prevents splash when running a wet road and that enhances a cooling effect by discharging a heat.

Description of the Related Art

Conventional tires have been generally developed for a running performance at a dry road. Such a tire may secure a stable running performance at a dry road, but when the tire runs a wet road, there is a problem that water is splashed on another vehicle running in the same direction as that of the vehicle or in a direction opposite to that of the vehicle or passersby moving along a sidewalk.

In order to solve such a problem, conventionally, by forming a protrusion at an outer side surface of a tire, splash was prevented from occurring between a road surface and a tread, but when the tire is exposed to an external impact factor, the tire is more easily damaged or aged and thus there is a problem that a life-span of the tire having such a protrusion is shortened.

A conventional protrusion did not perform other functions in addition to a function of preventing splash.

Korean Patent Laid-Open Publication No. 10-2010-0123226 (title of the invention: splash prevention tire having enhanced heat releasing property) relates to a splash prevention tire having an enhanced heat releasing property in which a ring-shaped splash prevention protrusion is protruded from a surface of a side wall portion, wherein a plurality of heat radiation fins are integrally formed at a gap between the ring-shaped splash prevention protrusion and a surface of the side wall portion.

PRIOR ART DOCUMENT (Patent document 1) Korean Patent Laid-Open Publication No. 10-2010-0123226 (Laid-open date, Nov. 24, 2010)

SUMMARY OF THE INVENTION

Technical Problem

The present invention has been made in an effort to provide a tire that prevents water on a road surface from splashing when a vehicle runs a wet road and that efficiently discharges a heat occurring according to a rotation thereof.

The technical problems of the present invention are not limited to the above-described technical problems and the other technical problems will be understood by those skilled in the art from the following description.

In accordance with an exemplary embodiment, a tire having a tread and a shoulder portion connected to the tread includes a protector portion provided in a circumferential direction at a side surface of the shoulder portion and in which a plurality of penetration portions are formed at a predetermined gap in a length direction; a plurality of protruding portions provided in the protector portion and formed at a predetermined gap in a length direction of the protector portion; and a plurality of installation grooves formed at a side surface of the shoulder portion such that the protruding portion attaches or detaches when the protruding portion enters or discharges.

The protector portion may have a body portion, an outer circumferential surface, which is one surface of the body portion exposed to the outside, and an inner circumferential surface, which is the other surface of the body portion that contacts a side surface of the shoulder portion, and the penetration portion may be formed in a groove shape at the inner circumferential surface.

The protruding portion may be connected to a protruded support portion between the penetration portions.

The protector portion may have a body portion, an outer circumferential surface, which is one surface of the body portion exposed to the outside, and an inner circumferential surface, which is the other surface of the body portion that contacts a side surface of the shoulder portion, and the penetration portion may penetrate the body portion.

The protruding portion may be formed at the inner circumferential surface.

The penetration portion may be penetrated in a height direction of the protector portion.

In the protruding portion, an external circumference of at least one portion of a protrusion head may be larger than an external circumference of a protrusion body.

The penetration portion may have the same cross-sectional shape based on a height direction of the protector portion.

Both end portions of the penetration portion may be enlarged based on a height direction of the protector portion.

An angle between a first tangent of a first opening surface of the penetration portion and a second tangent horizontal to the ground may be 0 to 30°.

Toughness of the protector portion may be 1 to 1.2 times than that of the tread.

Advantageous Effect(s) of the Invention

According to an exemplary embodiment of the present invention, as a protector portion is protruded from a side surface of a tire shoulder portion, when a tire runs a wet road, water cannot be splashed to another vehicle running in the same direction as that of the vehicle or in a direction opposite to that of the vehicle or passersby moving along a sidewalk.

Further, when the tire runs, by inducing air flow to a penetration portion formed in a protector portion, a tire shoulder portion is cooled and thus a heat can be discharged.

Because the protector portion that blocks splash can be attached to and detached from the tire, only when a vehicle runs a wet road, the protector portion can be attached to the tire.

The effects of the present invention are not limited to the above-described effects and it should be understood that the effects include entire effects that can be deduced from a configuration of the invention described in a detailed description of the present invention or claims.

DETAILED DESCRIPTION OF THE INVENTION

Hereinafter, the present invention will be described in detail with reference to the attached drawings. As those skilled in the art would realize the described embodiments may be modified in various different ways all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected (accessed, contact, and coupled)" to another element, the element may be "directly connected" to the other element and "indirectly connected" to the other element through a third element. Further, unless explicitly described to the contrary, the word "comprise" and variations such as "comprises" or "comprising", will be understood to imply the inclusion of stated elements but not the exclusion of any other elements.

Terms used in the present application are used for describing a specific exemplary embodiment and do not limit the present invention. When using in a description of the present invention and the appended claims, a singular form includes a plurality of forms unless it is explicitly differently represented. Further, in the present specification, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

Hereinafter, an exemplary embodiment according to the present invention will be described in detail with reference to the attached drawings.

Figure 1:
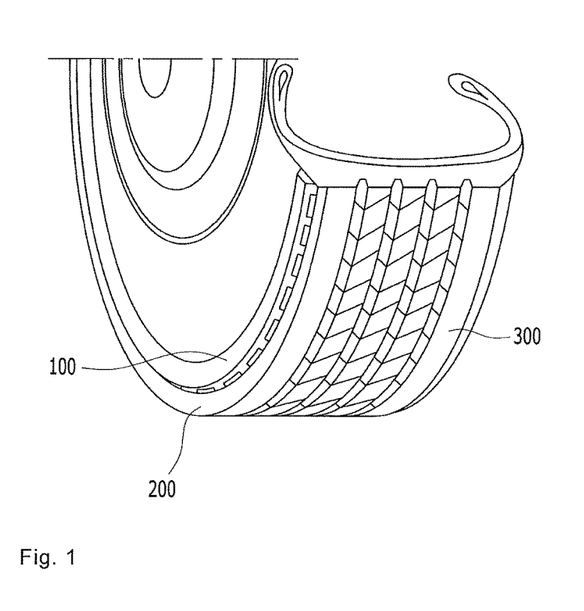
FIG. 1 is a perspective view illustrating a tire according to an exemplary embodiment of the present invention.
Figure 2:
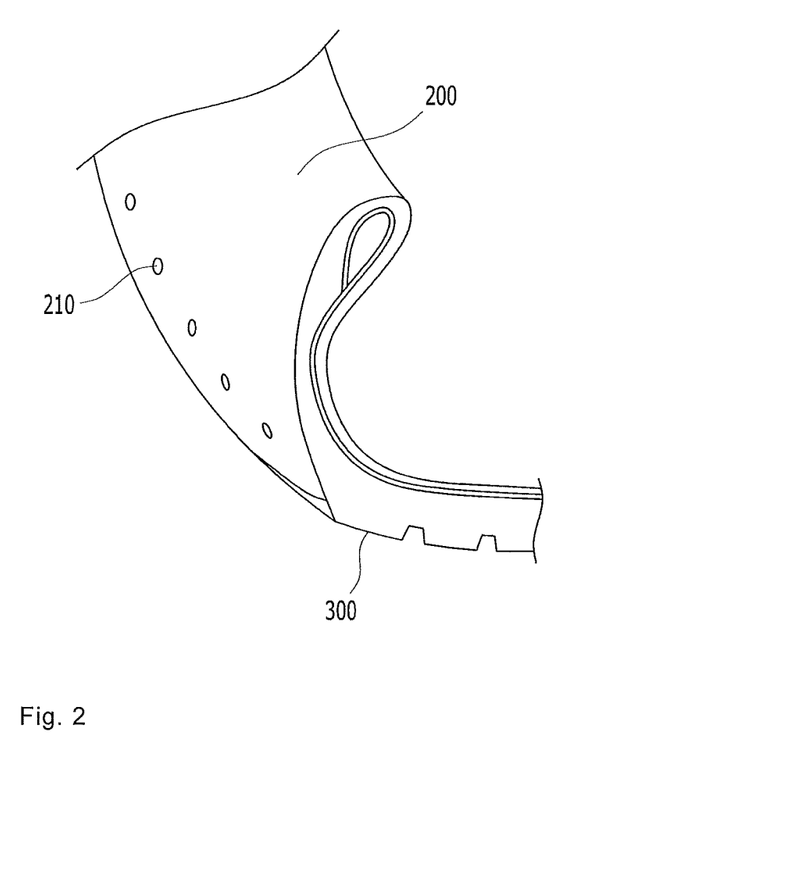
FIG. 2 is a cross-sectional view illustrating a portion of a tire according to an exemplary embodiment of the present invention.
Figure 3:
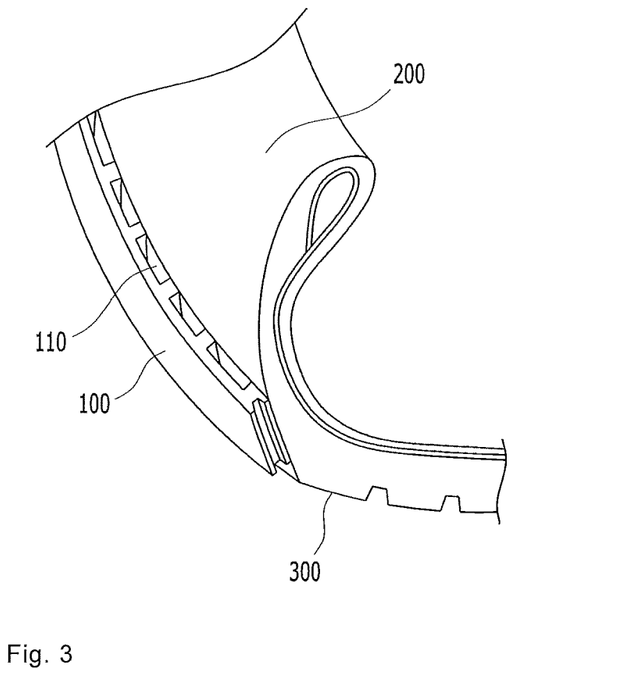
FIG. 3 is a cross-sectional view illustrating a portion of a tire in which a protector portion is installed according to an exemplary embodiment of the present invention.
Figure 4:
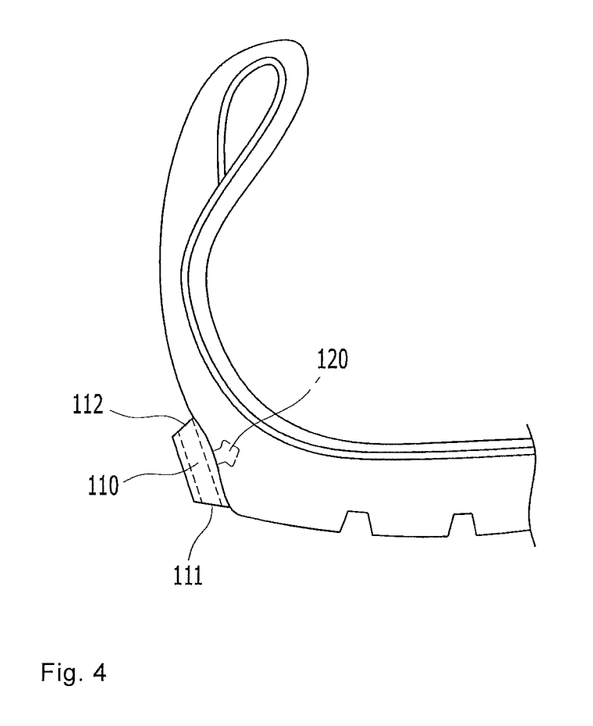
FIG. 4 is a cross-sectional view illustrating a tire according to an exemplary embodiment of the present invention.

FIG. 1 is a perspective view illustrating a tire according to an exemplary embodiment of the present invention, FIG. 2 is a cross-sectional view illustrating a portion of a tire according to an exemplary embodiment of the present invention, FIG. 3 is a cross-sectional view illustrating a portion of a tire in which a protector portion 100 is installed according to an exemplary embodiment of the present invention, and FIG. 4 is a cross-sectional view illustrating a tire according to an exemplary embodiment of the present invention.

As shown in FIGS. 1 to 4, a tire having a tread 300 and a shoulder portion 200 connected to the tread 300 may include a protector portion 100 provided in a circumferential direction at a side surface of the shoulder portion 200 and in which a plurality of penetration portions 110 are formed at a predetermined gap in a length direction; a plurality of protruding portions 120 provided in the protector portion 100 and formed at a predetermined gap in a length direction of the protector portion 100; and a plurality of installation grooves 210 formed at a side surface of the shoulder portion 200 such that the protruding portion 120 attaches or detaches when the protruding portion 120 enters or discharges.

When the tire runs a wet road, water may be stagnant at a road surface and thus when a surface of the tread 300 comes in close contact with the ground, splash may occur.

When the splash occurs, primary splash may be blocked by a body portion 130 of the protruded protector portion 100.

Even when the tire runs a wet road, air may move through the penetration portion 110, and in this case, water together with air is entered into and passes through the penetration portion 110 and thus water splash may be more effectively prevented.

When the tire runs a dry road, a temperature of a tire may increase by a friction between the tread 300 and the ground.

In this case, while air passes through and moves the penetration portion 110, the air cools the protector portion 100 and the shoulder portion 200 and thus a temperature of the tire may decline.

Air may move from a first opening surface 111 to a second opening surface 112 or from a second opening surface 112 to a first opening surface 111.

Figure 5:
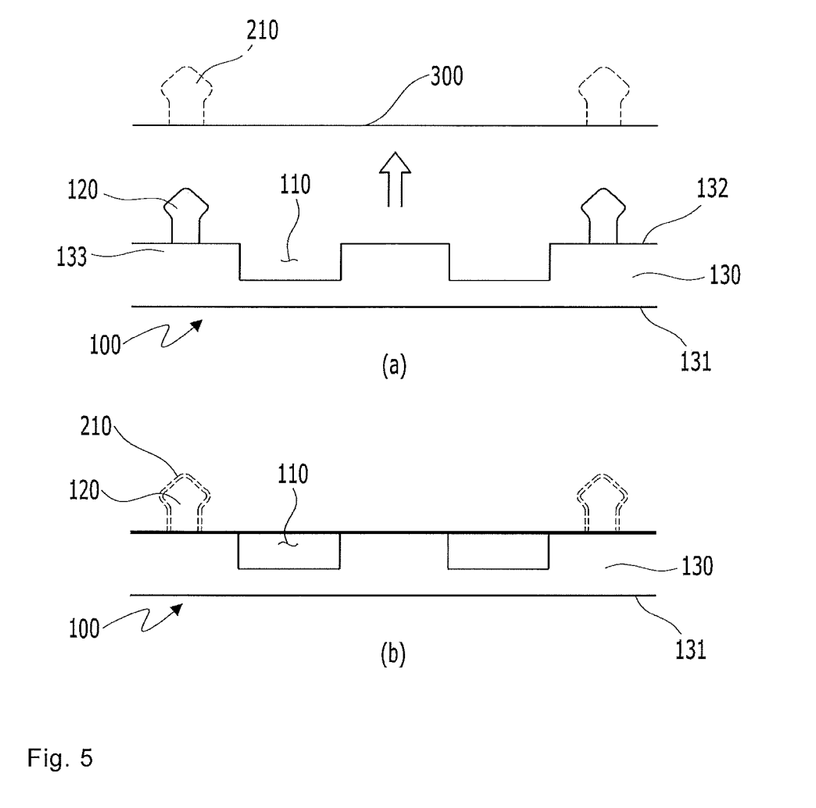
FIG. 5 is a use state diagram of an installed protector portion according to an exemplary embodiment of the present invention.

FIG. 5 is a use state diagram of an installed protector portion 100 according to an exemplary embodiment of the present invention.

FIG. 5A illustrates a state in which the protector portion 100 is separated from the shoulder portion 200 of the tire, and FIG. 5B illustrates a state in which the protector portion 100 is installed in the shoulder portion 200 of the tire.

As shown in FIG. 5, the protector portion 100 has a body portion 130, an outer circumferential surface 131, which is one surface of the body portion 130 exposed to the outside, and an inner circumferential surface 132, which is the other surface of the body portion 130 that contacts a side surface of the shoulder portion 200, and the penetration portion 110 may be formed in a groove shape at the inner circumferential surface 132.

The protruding portion 120 may be connected to a support portion 133 protruded between the penetration portions 110.

The protector portion 100 may have requiring rigidity by the support portion 133.

Because the protruding portion 120 is connected to the support portion 133, when installing the protector portion 100 at a side surface of the shoulder, an entrance pressure to the installation groove 210 may be fully transferred. When the tire runs, even if an impact is transferred to the protector portion 100, the protector portion 100 may be prevented from being separated or damaged.

Figure 6:
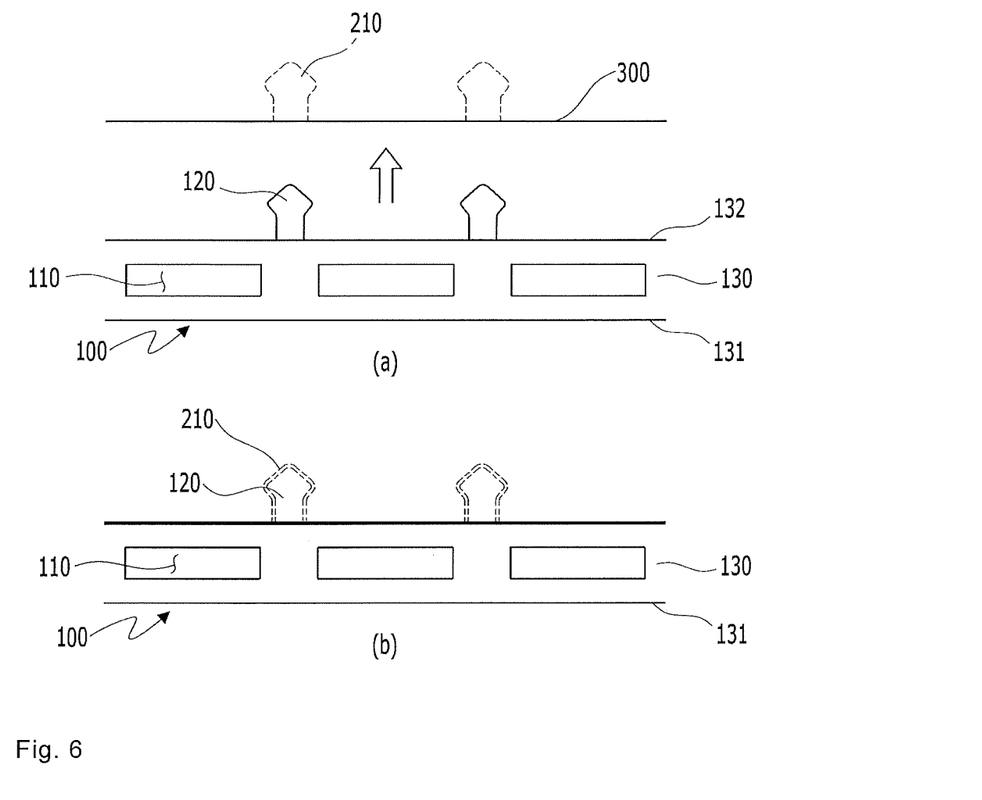
FIG. 6 is a use state diagram of an installed protector portion according to another exemplary embodiment of the present invention.

FIG. 6 is a use state diagram of an installed protector portion 100 according to another exemplary embodiment of the present invention.

FIG. 6A illustrates a state in which the protector portion 100 is separated from the shoulder portion 200 of the tire, and FIG. 6B illustrates a state in which the protector portion 100 is installed in the shoulder portion 200 of the tire.

As shown in FIG. 6, the protector portion 100 has a body portion 130, an outer circumferential surface 131, which is one surface of the body portion 130 exposed to the outside, and an inner circumferential surface 132, which is the other surface of the body portion 130 that contacts a side surface of the shoulder portion 200, and the penetration portion 110 may penetrate the body portion 130.

The protruding portion 120 may be formed at the inner circumferential surface 132.

Unlike when the penetration portion 110 is formed in a groove shape at the inner circumferential surface 132, when the penetration portion 110 penetrates the body portion 130, the protruding portion 120 may be installed at an entire portion of the inner circumferential surface 132 with strength of the inner circumferential surface 132 itself.

As shown in FIGS. 3 to 6, the penetration portion 110 may be penetrated in a height direction of the protector portion 100.

Here, the penetration portion 110 may have a first opening surface 111 formed in a central direction of the tire and a second opening surface 112 corresponding thereto.

Further, a height direction of the protector may be a length from the first opening surface 111 of the penetration portion 110 to the second opening surface 112.

Figure 7:
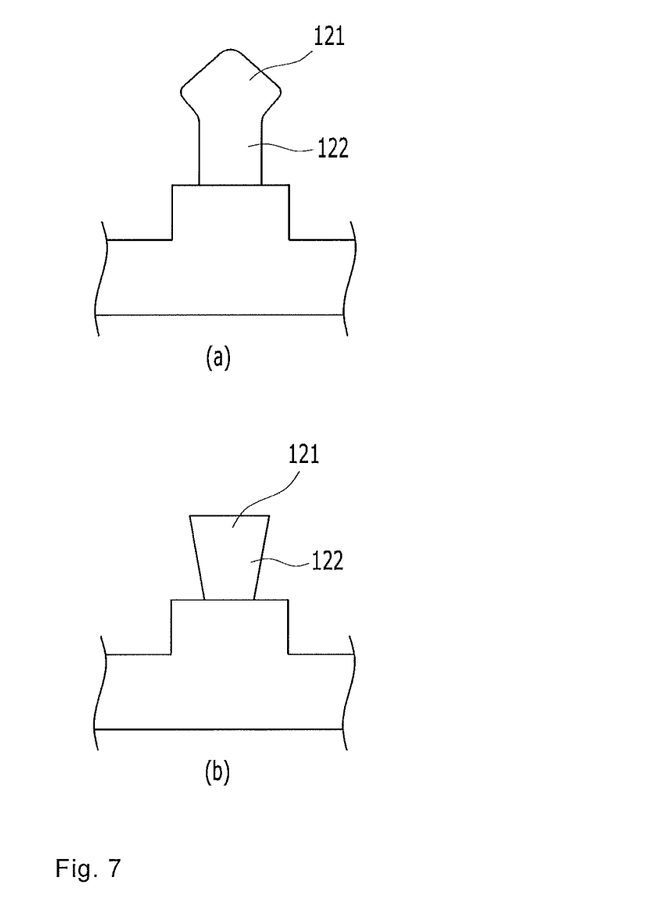
FIG. 7 is a cross-sectional view illustrating a protruding portion according to an exemplary embodiment and another exemplary embodiment of the present invention.

FIG. 7 is a cross-sectional view illustrating a protruding portion 120 according to an exemplary embodiment and another exemplary embodiment of the present invention.

FIG. 7A illustrates an exemplary embodiment of the protruding portion 120, and FIG. 7B illustrates another exemplary embodiment of the protruding portion 120.

As shown in FIGS. 7A and 7B, in the protruding portion 120, an external circumference of at least one portion of a protrusion head 121 may be larger than an external circumference of a protrusion body 122.

When the protruding portion 120 enters into or discharges from the installation groove 210, the protector portion 100 is attached to or is detached from the protruding portion 120 and thus the installation groove 210 is formed in a shape corresponding to the protruding portion 120, and when the protrusion head 121 is entered into the installation groove 210 and is discharged from the installation groove 210, a largest external circumference of the protrusion head 121 may be larger than an external circumference of the protrusion body 122 such that the protrusion head 121 is latched.

Figure 8:
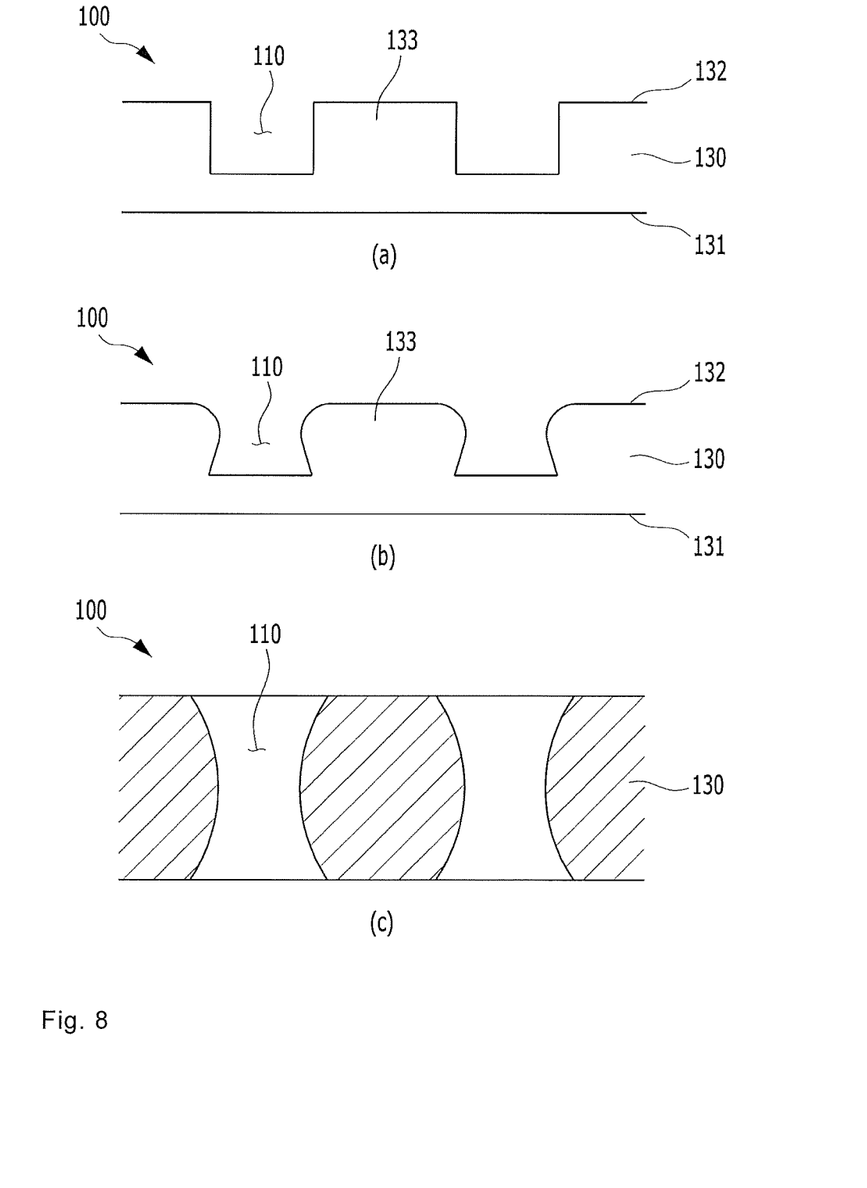
FIG. 8 is a cross-sectional view illustrating a penetration portion according to an exemplary embodiment and another exemplary embodiment of the present invention.

FIG. 8 is a cross-sectional view illustrating a penetration portion 110 according to an exemplary embodiment and another exemplary embodiment of the present invention.

FIG. 8A is a cross-sectional view of a penetration portion 110 having the same sectional shape in a height direction of the protector portion 100, and FIGS. 8B and 8C are cross-sectional views of a penetration portion 110 having different sectional shapes in a height direction of the protector portion 100.

As shown in FIG. 8A, the penetration portion 110 may have the same cross-sectional shape based on a height direction of the protector portion 100.

As described above, when the penetration portion 110 has the same cross-sectional shape, air passing through the penetration portion 110 may move in a constant movement direction.

Alternatively, as shown in FIGS. 8B and 8C, both end portions of the penetration portion 110 may be enlarged based on a height direction of the protector portion 100.

Here, both end portions may mean a portion in which the first opening surface 111 and the second opening surface 112 are formed.

FIG. 8B is a cross-sectional view illustrating the protector portion 100 in a thickness direction, and FIG. 8C is a cross-sectional view illustrating the protector portion 100 in a height direction.

As shown in FIGS. 8B and 8C, when the first opening surface 111 and second opening surface 112 are enlarged further than a central portion of the penetration portion 110, a movement pressure of air passing through from the first opening surface 111 to the second opening surface 112 increases and thus a movement length of air that moves from the second opening surface 112 to a tire central portion increases, thereby enlarging a cooling range and improving cooling efficiency.

Cooling efficiency can be improved with increase of a movement pressure of some air passing through from the second opening surface 112 to the first opening surface 111.

Figure 9:
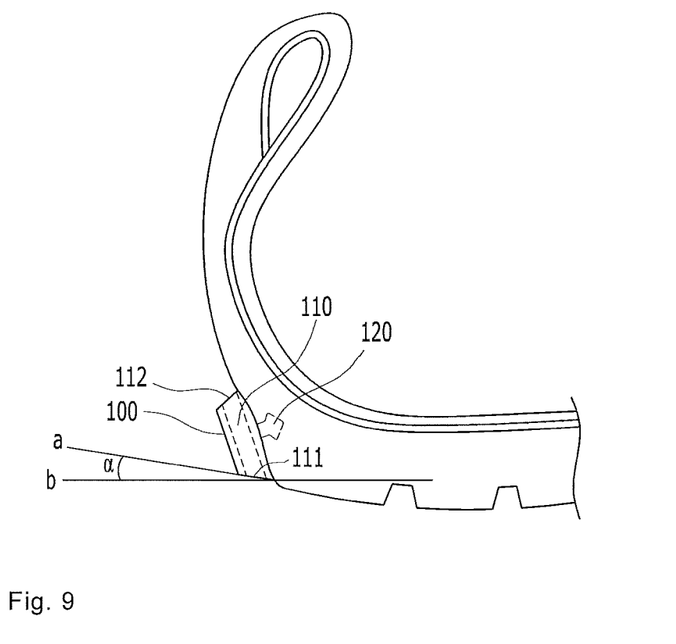
FIG. 9 is a cross-sectional view illustrating a tire according to an exemplary embodiment of the present invention.

FIG. 9 is a cross-sectional view illustrating a tire according to an exemplary embodiment of the present invention.

As shown in FIG. 9, an angle α between a first tangent a of the first opening surface 111 of the penetration portion 110 and a second tangent b horizontal to the ground may be 0 to 30°.

Here, when an angle α between a first tangent a and a second tangent b horizontal to the ground is 0°, an angle between the first opening surface 111 and the outer circumferential surface 131 may be a right angle.

When an angle α between a first tangent a and a second tangent b is less than 0°, i.e., when an angle between the first opening surface 111 and a side surface of the shoulder portion 200 is an acute angle, a movement of air entered into the penetration portion 110 may be disturbed.

When an angle α between a first tangent a and a second tangent b exceeds 30°, a splash angle of water exceeds 30° and thus a moving distance of splash water may increase and splash prevention efficiency may be thus deteriorated.

Toughness of the protector portion 100 may be 1 to 1.2 times than that of the tread 300.

When toughness of the protector portion 100 is less than 1 times than that of the tread 300, a damage probability of the protector portion 100 may increase. When toughness of the protector portion 100 exceeds 1.2 times than that of the tread 300, even if the tread 300 is deformed, the protector portion 100 is not detached and thus the tread 300 and the shoulder portion 200 may be damaged.

A tire of the present invention may be applied to the entire of a pneumatic tire, a run-flat tire, and a non-pneumatic tire.

The foregoing description of the present invention is an illustration, and it may be understood by a person of ordinary skill in the art that the present invention may be easily changed in different detailed forms without changing the technical spirit or an essential characteristic of the present invention. Therefore, it should be understood that the foregoing exemplary embodiments are not limited but are illustrative. For example, each constituent element described in a single type may be distributedly performed, and constituent elements described in a distributed type may be performed in a combined form.

The scope of the present invention is represented by claims to be described later, and it should be analyzed that a meaning and the scope of claims and an entire change or a changed form derived from an equivalent concept thereof are included in the scope of the present invention.

| Reference Numerals from the Figures | |
|---|---|
| 100: protector portion | 110: penetration portion |
| 111: first opening surface | 112: second opening surface |
| 120: protruding portion | 121: protrusion head |
| 122: protrusion body | 130: body portion |
| 131: outer circumferential surface | |
| 132: inner circumferential surface | |
| 133: support portion | 200: shoulder portion |
| 210: installation groove | 300: tread |

What is claimed is:

1. A tire comprising:

a tread and a shoulder portion connected to the tread;

a protector portion configured to be attached to a side surface of the shoulder portion so as to be disposed in a circumferential direction of the shoulder portion, and in which a plurality of penetration portions are formed at a predetermined gap in a length direction of the protector portion;

a plurality of protruding portions protruded from the protector portion and arranged at a predetermined gap in the length direction of the protector portion; and a plurality of installation grooves formed at the side surface of the shoulder portion, wherein the protector portion has a body portion, an outer circumferential surface which is one surface of the body portion exposed to an outside of the tire, and an inner circumferential surface which is another surface of the body portion that is configured to contact the side surface of the shoulder portion, wherein the plurality of penetration portions are respectively formed in a groove shape at the inner circumferential surface, wherein the plurality of protruding portions are respectively connected to a support portion protruded between the adjacent respective penetration portions, and wherein each of the plurality of protruding portions includes a protrusion head and a protrusion body extended from the protrusion head, and an external circumference of at least one portion of the protrusion head is larger than an external circumference of the protrusion body.

2. The tire of claim 1, wherein the plurality of installation grooves are formed such that the plurality of protruding portions respectively attach to or detach from the side surface of the shoulder portion.

3. The tire of claim 1, wherein the plurality of penetration portions are respectively penetrated in a height direction of the protector portion.

4. The tire of claim 1, wherein the plurality of penetration portions respectively have a same cross-sectional shape based on a height direction of the protector portion.

5. The tire of claim 1, wherein both end portions of a penetration portion of the plurality of penetration portions are enlarged based on a height direction of the protector portion.

6. The tire of claim 1, wherein an angle between a first tangent of a first opening surface of a penetration portion of the plurality of penetration portions and a second tangent horizontal to ground is 0 to 30°.

7. The tire of claim 1, wherein a toughness of the protector portion is 1 to 1.2 times than that of the tread.

8. The tire of claim 1, wherein
the plurality of penetration portions respectively penetrate the body portion.

9. The tire of claim 8, wherein the plurality of protruding portions are respectively formed at the inner circumferential surface.

10. The tire of claim 8, wherein the plurality of penetration portions are respectively penetrated in a height direction of the protector portion.

11. The tire of claim 10, wherein a toughness of the protector portion is 1 to 1.2 times than that of the tread.

* * * * *